(12) United States Patent
Henkel

(10) Patent No.: US 7,263,601 B2
(45) Date of Patent: Aug. 28, 2007

(54) SEQUENCER UNIT WITH INSTRUCTION BUFFERING

(75) Inventor: Thomas Henkel, Boeblingen (DE)

(73) Assignee: Verigy (Singapore) Pte. Ltd., Singapore (SG)

( * ) Notice: Subject to any disclaimer, the term of this patent is extended or adjusted under 35 U.S.C. 154(b) by 221 days.

(21) Appl. No.: 10/890,702

(22) Filed: Jul. 14, 2004

(65) Prior Publication Data

US 2005/0050302 A1 Mar. 3, 2005

(30) Foreign Application Priority Data

Aug. 6, 2003 (EP) .................................. 03102448

(51) Int. Cl.
*G06F 11/263* (2006.01)
*G06F 11/28* (2006.01)

(52) U.S. Cl. ..................................................... 712/225

(58) Field of Classification Search ................ 712/225; 710/240; 709/231, 236, 240
See application file for complete search history.

(56) References Cited

U.S. PATENT DOCUMENTS 4,095,269 A 6/1978 Kawabe et al. ............. 364/200
6,070,235 A 5/2000 Cheong et al. ............... 712/23
6,249,880 B1* 6/2001 Shelly et al. .................. 714/34
6,978,330 B1* 12/2005 Joffe et al. ................... 710/240
7,039,841 B2* 5/2006 Cullen et al. ............... 714/724
7,096,347 B2* 8/2006 Moore ........................ 712/227

FOREIGN PATENT DOCUMENTS

EP 0 376 004 4/1990

OTHER PUBLICATIONS

JP Patent Abstract 61169778, Jul. 31, 1986, NEC Corp.
JP Patent Abstract 59003647, Jan. 10, 1984, Fujitsu Ltd.

* cited by examiner

*Primary Examiner*—Eric Coleman

(57) ABSTRACT

A sequencer unit includes a first instruction processing unit, an instruction buffer and a second instruction processing unit. The first instruction processing unit is adapted for receiving and processing a stream of instructions, and for issuing, in case data is required by a certain instruction, a corresponding data read request for fetching said data. Instructions that wait for requested data are buffered in the instruction buffer. The second instruction processing unit is adapted for receiving requested data that corresponds to one of the issued data read requests, for assigning the requested data to the corresponding instructions buffered in the instruction buffer, and for processing said instructions in order to generate an output data stream.

12 Claims, 3 Drawing Sheets

SEQUENCER UNIT WITH INSTRUCTION BUFFERING

BACKGROUND OF THE INVENTION

1. Field of the Invention

The present invention relates to a sequencer unit and to a method for generating an output data stream. The present invention further relates to a channel and to an automated test equipment.

2. Brief Description of Related Developments

For a variety of applications, data streams comprising complex data sequences might be required. Complex data sequences comprising initialisation sequences, subroutines, loops of repeated data, etc. are generated by means of a sequencer unit. To said sequencer unit, both sequencer instructions and sequencer data are provided. In accordance with said sequencer instructions, the sequencer data is converted into an output data stream.

SUMMARY OF THE INVENTION

It is an object of the invention to provide a sequencer unit that allows for an improved mode of operation. The object is solved by the independent claims. Preferred embodiments are shown by the dependent claims.

A sequencer unit according to embodiments of the present invention comprises a first instruction processing unit that is adapted for receiving and processing a stream of instructions. In case data is required by a certain instruction, a corresponding data read request for fetching said data is issued. The instructions that wait for requested data are buffered in an instruction buffer. The sequencer unit further comprises a second instruction processing unit adapted for receiving requested data that corresponds to one of the issued data read requests. The second instruction processing unit assigns the requested data to the corresponding instructions buffered in the instruction buffer, and processes said instructions in order to generate an output data stream.

Instructions are provided to the first instruction processing unit, and there, said instructions are preprocessed, e.g. in order to find out whether a certain instruction requires data that has to be fetched from any kind of storage. If data is required by a certain instruction, a corresponding data read request will be issued by the first instruction processing unit. Fetching the requested data will take some time. In the meantime, the respective instruction is stored to the instruction buffer, and there, it will wait for the requested data. When the requested data arrives at the second instruction processing unit, the second instruction processing unit assigns the requested data to the corresponding instruction buffered in the instruction buffer. Now, both the instruction and the requested data are available, and processing of the instruction can be completed. As a result, the sequencer unit's output data stream is generated.

In sequencer units of the prior art, instructions have been processed one at a time. After a data read request corresponding to a first instruction was issued, the sequencer unit has been waiting until the processing of said first instruction has been finished. Then, a data read request corresponding to a subsequent second instruction has been issued. Fetching of requested data may take some time, though, and therefore, idle times will occur. When instructions are processed one at a time, the sequencer unit's resources are not used very efficiently.

The sequencer unit according to embodiments of the present invention issues data read requests some time in advance before the data is actually needed. For example, even before the data requested by a first instruction has arrived at the second processing unit, a data read request related to a subsequent second instruction might be issued. Though fetching the required data may take some time, said data will be available when the processing of the respective instruction is continued in the second instruction processing unit. Hence, the first and the second instruction are partly processed in parallel. Idle times due to latency can be considerably reduced.

The sequencer unit's different stages allow for an interleaved instruction processing. As a consequence, a smooth and reliable operation is accomplished.

According to a preferred embodiment of the invention, the first instruction processing unit receives said stream of instructions in response to instruction read requests that are issued by the first instruction processing unit. When the processing of a block of instructions that has previously been fetched is almost finished, a new block of instructions will be requested. Thus, the fetching of new blocks of instructions is continuously adjusted to the sequencer unit's processing speed, and a stream of instructions is provided to the first instruction processing unit.

According to another preferred embodiment, the stream of instructions comprises at least one of data sequencing instructions, flow control instructions, break instructions, set data instructions.

Data sequencing instructions are responsible for transforming blocks of input data into a corresponding output data stream. There might e.g. exist data sequencing instructions that convert a block of input data into a corresponding linear stream of output data. Besides that, there might e.g. exist data sequencing instructions adapted for converting input data into a corresponding stream of output data in a way that in said output data stream, a certain sequence of input data is repeated several times.

The stream of instructions might further comprise flow control instructions. Said flow control instructions do not participate in generating the output data stream. Instead, they are responsible for modifying the order of instruction processing. For example, said flow control instructions might comprise conditional instructions, branch instructions, loop instructions, etc. Whenever a conditional branch occurs, the respective predefined condition of said branch is evaluated, and in dependence on the outcome of said evaluation, the branch will either be taken or not. Said flow control instructions might e.g. comprise loop instructions for implementing a loop functionality, which means that certain instructions or certain groups of instructions are repeated a predefined number of times. Furthermore, the flow control instructions might e.g. comprise instructions for jumping from the main instruction stream to a subroutine, and for returning from the subroutine to the main instruction stream. In general, flow control instructions are useful for simplifying the generation of complex streams of output data. The number of instructions required for generating a certain output data stream may be considerably reduced.

Besides that, the set of instructions might e.g. comprise break instructions, whereby said break instructions are adapted for generating an arbitrary number of idle cycles. During said idle cycles, a break-waveform might e.g. be repeatedly provided to the DUT.

The set of instructions might e.g. comprise set data instructions, with said set data instruction being used for setting and modifying internal parameters of the sequencer unit and of the system encompassing the sequencer unit. The set data instructions allow to control the system's settings.

According to a preferred embodiment of the invention, said flow control instructions are processed by the first instruction processing unit. Flow control instructions are adapted for modifying the flow of instruction processing, and accordingly, no data read requests are issued with regard to said flow control instructions. Flow control instructions may be entirely processed within the first instruction processing unit; they do not have to be provided to the instruction buffer and to the second instruction processing unit.

According to yet another preferred embodiment of the invention, the processing of data sequencing instructions is started within the first instruction processing unit, and it is completed within the second instruction processing unit. In order to fetch blocks of input data that are required for processing the data sequencing instructions, the first instruction processing unit has to issue corresponding data read requests to some kind of storage. The requested data blocks arrive at the second instruction processing unit. There, both the data sequencing instruction that has requested the data as well as the corresponding data blocks are available, and processing of said data sequencing instruction can be completed. For example, the respective data sequencing instruction might generate a linear stream of output data by routing the received input data to the sequencer unit's output. Alternatively, the respective data sequencing instruction might e.g. be an instruction of the repeat type that repeatedly provides a certain portion of the input data at the sequencer unit's output. Generally speaking, the first instruction processing unit is responsible for keeping track of the instruction flow and for issuing data read requests, while the second instruction processing unit is responsible for the tasks related to sequencing. Thus, the multi-stage approach gives rise to a well-defined responsibility assignment.

According to another preferred embodiment of the invention, instructions that wait for requested data are stored, by the first instruction processing unit, to the instruction buffer. After a data read request for a certain instruction has been issued, said instruction is written to the instruction buffer. Within the first instruction processing unit, the instructions are processed in sequential order, and preferably, the data read requests are also issued in sequential order. This sequential order is preserved when instructions that wait for requested data are stored to the instruction buffer.

According to another preferred embodiment of the invention, requested data is assigned, by the second instruction processing unit, in sequential order to the corresponding instructions in the instruction buffer. If the data read requests that have been issued by the first instruction processing unit are worked off in the order of occurrence, the corresponding data blocks will arrive at the second instruction processing unit in sequential order as well. The second instruction processing unit is responsible for assigning said data blocks in the order of arrival to corresponding instructions that are read out of the instruction buffer.

Preferably, said instruction buffer is realized as a FIFO (First In First OUT) buffer.

According to a preferred embodiment of the invention, the instructions are provided by an instruction memory that is preferably implemented as an SRAM (Static RAM). The dedicated instruction memory receives instruction read requests from the first instruction processing unit, fetches the requested blocks of instructions, and provides the instructions to the first instruction processing unit. By providing a dedicated instruction memory, it is made sure that instruction read requests can be taken care of immediately.

It is advantageous to implement the instruction memory as an SRAM, because an SRAM allows for a low-latency access.

According to another preferred embodiment, requested data is received from a data memory, whereby said data memory is preferably implemented as a DRAM (Dynamic RAM). For generating the output data stream, large amounts of input data might be required. Therefore, the memory for storing said data must not be too small. By providing a dedicated instruction memory and a dedicated data memory, data read requests and instruction read requests may be processed in parallel. Even if a large block of data has to be fetched from the data memory, the instruction stream will not be disrupted. Preferably, the dedicated data memory is implemented as a DRAM. A DRAM is cheaper and smaller than an SRAM and therefore, it is well suited for storing large amounts of input data.

Alternatively, according to another preferred embodiment of the invention, the sequencer unit might receive both instructions and data from a shared memory. By replacing the instruction memory and the data memory by one shared memory, the sequencer's set-up is simplified, and a cheaper and smaller solution is accomplished. In case a shared memory is used, both the latency requirements of the instruction read requests and the bandwidth requirements of the data read requests have to be considered. The read accesses for fetching data and the read accesses for fetching instructions have to be scheduled in a way that both said latency requirements and said bandwidth requirement are fulfilled. According to embodiments of the present invention, the data read requests are issued well in advance. This provides the required flexibility when setting up a suitable sequence of read accesses to the shared memory. Preferably, said shared memory is realized as a DRAM or as a RDRAM, because in a dynamic RAM, large quantities of data can be stored.

Preferably, data read requests issued by the first instruction processing unit indicate both the start address and the size of the requested data. By specifying both the start address and the size, said data block can be unambiguously identified within the respective memory.

In a preferred embodiment of the invention, the sequencer unit is employed in a channel of an automated test equipment (ATE). The channel is responsible for at least one of: providing stimulus data to at least one device under test (DUT), and receiving response data from said at least one DUT. In a multi-channel system, the test patterns provided to different pins of a DUT have to have a well-defined timing relative to each other. If any of the streams of test data gets disrupted, the relative timing between the test data streams will be lost, and the obtained test results will be faulty. Therefore, disruptions and discontinuities of the test data stream must not occur. In order to accomplish a smooth and reliable operation, it is advantageous to employ a sequencer unit according to an embodiment of the present invention.

According to a further preferred embodiment of the invention, the test data comprises at least one of vector data and expected data. The stream of test data might either comprise only vector data, only expected data, or both vector data and expected data. The vector data is utilized for generating stimulus data for the at least one DUT. The expected data is used for evaluating response data obtained from the at least one DUT, whereby said evaluation involves comparing the response data and the expected data.

Preferably, said test data is provided to at least one of the channel's drive path and the channel's receive path. In case the stream of test data comprises vector data, said vector data is provided to the channel's drive path. There, said vector data might be transformed, e.g. by means of a waveform table, into a sequence of corresponding waveforms. In case the test data comprises expected data, said test data is provided to the channel's receive path, which might also comprise a waveform table adapted for transforming the expected data into expected waveforms.

According to yet another preferred embodiment of the invention, the test data might additionally comprise set data for modifying the channel's settings. The set data is part of the output data stream generated by the sequencer unit. The set data might e.g. comprise control settings, values that are to be written to internal registers, setting parameters, etc. Besides that, the reprogramming of waveform tables might be effected by said set data. Furthermore, parts of said set data might e.g. be inserted in the sequencer unit's output data stream, in order to modify control settings of the channel.

In another embodiment, the sequencer unit's stream of test data comprises refresh vectors. The at least one DUT might comprise one or more DRAM memories, and from time to time, a refresh of said DRAM memories might have to be performed. For this purpose, refresh vectors might be inserted into the stream of test data.

A sequencer unit according to embodiments of the present invention may be an integral part of a channel, whereby said sequencer unit is adapted for generating test data. The channel further comprises at least one storage, whereby at least one of instructions and data may be stored in said at least one storage. Besides that, the channel comprises a result processing unit adapted for evaluating response data obtained from at least one DUT.

The channels are responsible for at least one of: providing stimulus data to at least one DUT, and receiving response data from said at least one DUT.

An automated test equipment (ATE) for testing one or more DUTs might comprise one or more channels as described above. Furthermore, said automated test equipment might comprise a central facility, whereby said central facility is responsible for coordinating the channels.

According to a preferred embodiment, the automated test equipment is implemented as a centralized tester architecture. In this embodiment, the channels will be controlled to a large extent by the central facility. For example, the centralized tester architecture will be under clock control of the central facility.

According to an alternative embodiment of the invention, the automated test equipment is implemented according to a tester-per-pin architecture. In this embodiment, only a few tasks are assumed by the central facility. For the most part, the channels act as independent functional units.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF EMBODIMENTS OF THE INVENTION

Figure 1:
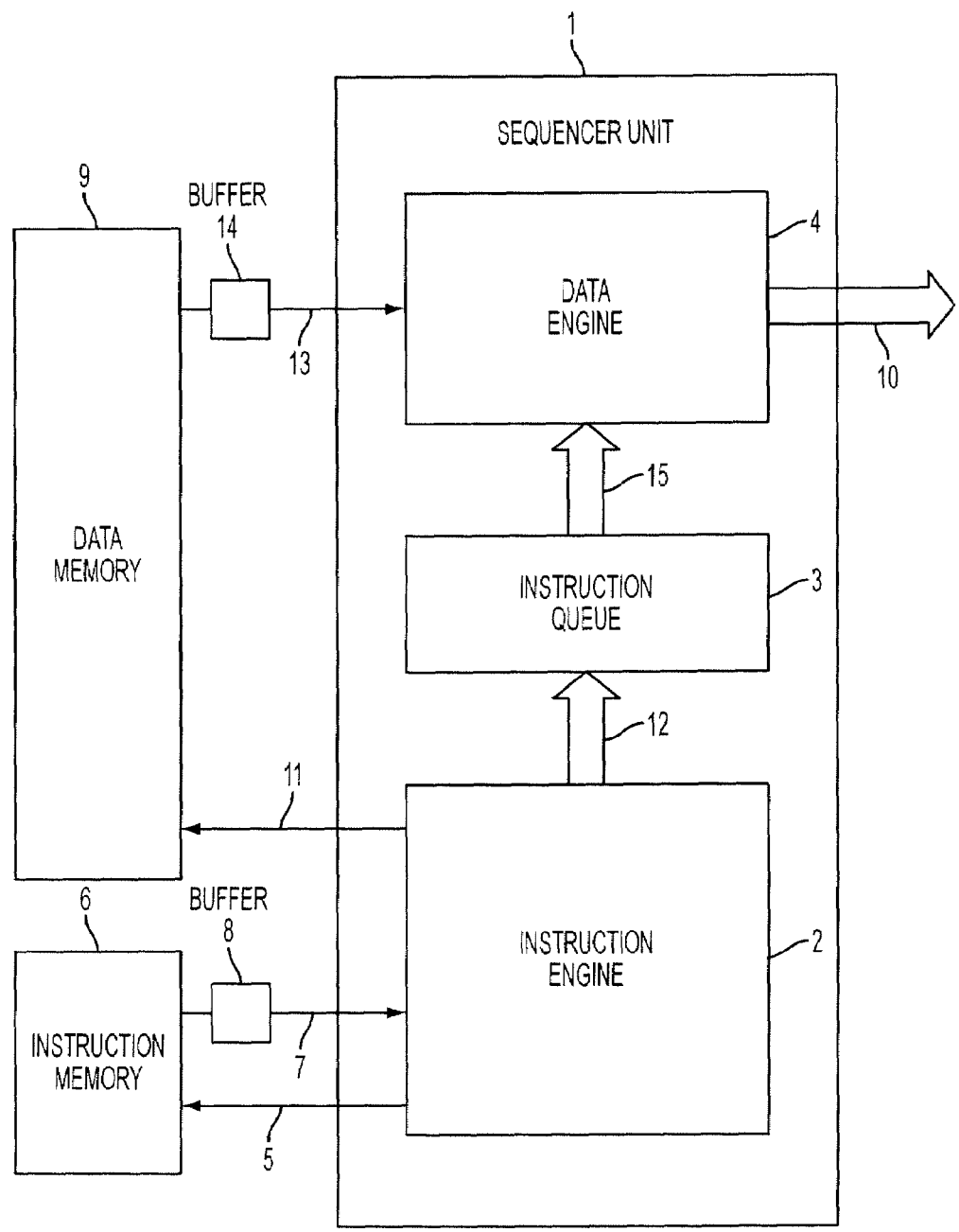
FIG. 1 depicts a block diagram of a sequencer unit according to an embodiment of the present invention.

In FIG. 1, the set-up of a sequencer unit according to an embodiment of the present invention is shown. The sequencer unit 1 comprises an instruction engine 2, an instruction queue 3, and a data engine 4. When the sequencer unit's operation is started, the instruction engine 2 forwards an instruction read request 5 to the instruction memory 6. The instruction read request 5 specifies a block of data that is to be read from the instruction memory 6. After the corresponding read access to the instruction memory 6 has been performed, the requested instructions 7 are provided to the instruction engine 2. There, a preprocessing of said instructions is performed. Whenever the preprocessing of a block of instructions that has been fetched from the instruction memory 6 is close to being completed, the instruction engine 2 will issue an instruction read request 5 for a subsequent block of instructions. The instruction memory 6 is preferable realized as an SRAM, because an SRAM allows for low-latency read accesses. The instructions read from the instruction memory 6 might be buffered in a buffer 8, and the instruction engine 2 might obtain required instructions from said buffer 8. The buffer 8 is preferably implemented as a FIFO buffer.

The instruction engine 2 is responsible for preprocessing the stream of instructions. The instructions provided to the instruction engine 2 might e.g. comprise flow control instructions, data sequencing instructions, break instructions, set data instructions, etc. The sequential order in which the instructions flow has to be processed is determined by flow control instructions. Said flow control instructions might e.g. comprise conditional branches or loops. Furthermore, jumps from the main instruction flow to a subroutine and back from the subroutine to the main instruction flow may occur, with said subroutine comprising a set of instructions. For processing a flow control instruction, it is not necessary to fetch input data from a memory, and for this reason, flow control instructions may be entirely processed within the instruction engine 2. In contrast, for processing data sequencing instructions or set data instructions, it may be necessary to fetch data blocks from a data memory 9. Data sequencing instructions are responsible for actually generating the output data stream 10 of the sequencer unit 1. Set data instructions are used for reprogramming control settings of the sequencer unit 1. Furthermore, set data instructions might also be used for reprogramming control settings of the system encompassing the sequencer unit 1. For processing set data instructions, it might also be necessary to fetch data from the data memory 9.

The instruction engine 2 has to check for each one of the instructions whether data has to be fetched from the data memory 9. For each instruction that requires data to be fetched, the instruction engine 2 will forward a corresponding data read request 11 to the data memory 9. In each of the data read requests 11, the start address and the size of the requested data are indicated. Fetching the requested data will take some time. The instruction engine 2 is not responsible for completing the processing of instructions for which a data read request has been issued. Instructions 12 that wait for requested data are written, by the instruction engine 2, to the instruction queue 3. The instruction queue 3 is preferably implemented as a FIFO buffer. The instruction queue 3 contains all the instructions that wait for requested data, whereby the sequential order of said instructions is preserved.

Large amounts of data may be required for generating a continuous output data stream 10. In order to store the required data, the size of the data memory 9 has to be much larger than the size of the instruction memory 6. Preferably, the data memory 9 is realized as a DRAM, because DRAMs can be built much smaller than SRAMs. The data read requests 11 issued by the instruction engine 2 are taken care of in the order of occurrence. The respective data blocks are fetched from the data memory 9, and the requested data 13 is provided to the sequencer unit's data engine 4. The requested data might be buffered in a buffer 14, whereby said buffer 14 is preferably implemented as a FIFO buffer.

The data engine 4 is responsible for assigning the requested data 13 to the respective instructions of the instruction queue 3 that wait for requested data. The data read requests 11 are issued in accordance with the sequential order of the instruction flow. The corresponding read accesses to the data memory 9 are scheduled in accordance with the order of said data read requests 11. For this reason, the blocks of requested data 13 arrive at the data-engine 4 in a sequential order that corresponds to the sequential order of the instructions within the instruction queue 3. Whenever a block of requested data 13 arrives at the data engine 4, the data engine 4 will fetch the next instruction from the instruction queue 3 and assign the received data to said instruction. Now, both the instruction and the corresponding input data are available, and the data engine 4 continues to process the instruction in order to generate data of the output data stream 10.

An instruction executed by the data engine 4 might e.g. route the received data as a stream of output data to the sequencer unit's output. An instruction executed by the data engine 4 might as well repeat certain parts of the input data for a predefined number of times when generating the output data stream. Furthermore, there might exist instructions adapted for inserting initialization sequences or refresh sequences into the output data stream. Other instructions might provide pseudo random data at the sequencer unit's output for a predefined number of clock cycles.

Figure 2A:
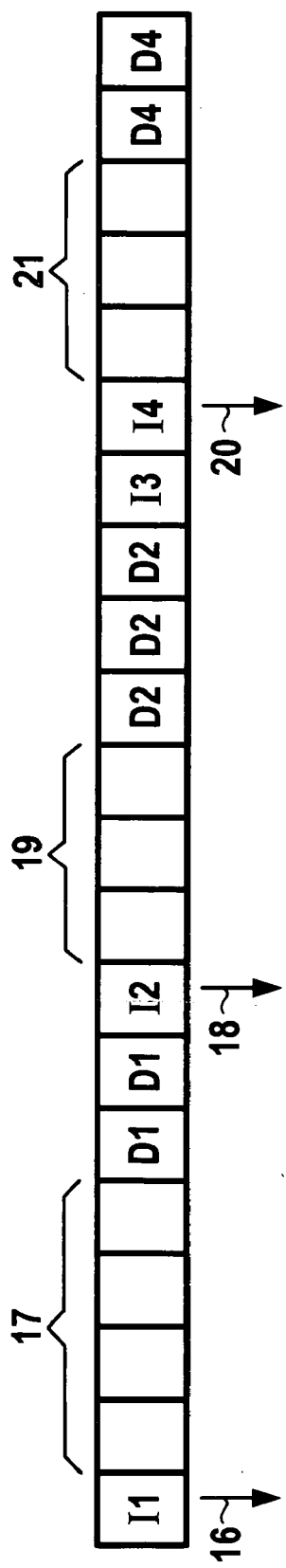
FIG. 2A shows the timing of instructions, of data read requests, and of the arrival of requested data for a sequencer unit according to the prior art.

FIG. 2A shows the timing of instruction processing for a sequencer unit according to the prior art. Said sequencer unit processes the instructions one at a time, which implies that processing of a subsequent instruction is not started until processing of the preceding instruction has been finished. For example, for processing the instruction I1 shown in FIG. 2A, input data is required, and accordingly, a data read request 16 is issued. After an idle time 17 that is due to the data memory's latency, the requested data D1 is received, and the processing of I1 can be completed. Then, processing of the instruction I2 is started, and a data read request 18 is issued. After a waiting period 19, the requested data D2 is received, and the processing of I2 is continued. Next, the instruction I3 is processed. Said instruction does not require any data to be fetched from the data memory. Then, I4 is taken care of, and a corresponding instruction read request 20 is provided to the data memory. After an idle time 21, the data D4 is available, and processing of I4 is completed.

Figure 2B:
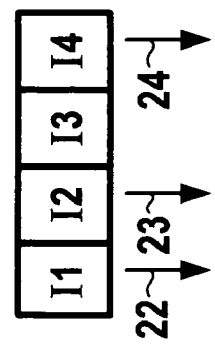
FIG. 2B shows the timing of instructions, of data read requests, and of the arrival of requested data for a sequencer unit according to an embodiment of the present invention.

FIG. 2B shows the timing of instruction processing for a sequencer unit according to an embodiment of the present invention. The instructions I1, I2,I3, I4 are preprocessed by the instruction engine 2. During said preprocessing, the instruction engine 2 detects that for processing the instructions I1, I2,I4, blocks of input data have to be fetched from the memory. With respect to the instruction I3, no input data is required. Accordingly, the instruction engine 2 transmits data read requests 22, 23, 24 to the data memory, and the instructions I1, I2, I4 are written to the instruction queue 3. After some time, the data D1 for the instruction I1 arrives at the sequencer unit's data engine 4. There, the data D1 is assigned to I1, and the processing of I1 is completed.

According to embodiments of the present invention, the data read requests 23, 24 of the instructions I2, I4 are issued by the instruction engine 2 right after the data read request 22 has been issued. Hence, the data read requests 23, 24 are issued even before the data D1 for the instruction I1 is received and processed by the data engine 4. For this reason, the data D2 is available right after the data D1 has been received, and the processing of I2 can be continued. An extra waiting period, such as e.g. the waiting period 19 shown in FIG. 2A, is not required any more. The same holds true for the data D4, which is available right after the data D2 has been received. By issuing the data read requests 23, 24 well in advance, a continuous data flow is accomplished, and the efficiency of the sequencer unit is considerably improved.

The sequencer unit according to an embodiment of the present invention can be employed in any kind of application where a continuous stream of output data has to be generated. The sequencer according to an embodiment of the present invention might e.g. be utilized in the field of testing. In particular, the sequencer unit might e.g. be employed in a channel of an automated test equipment (ATE). The sequencer unit is by no means restricted to applications in the field of testing, though.

Figure 3:
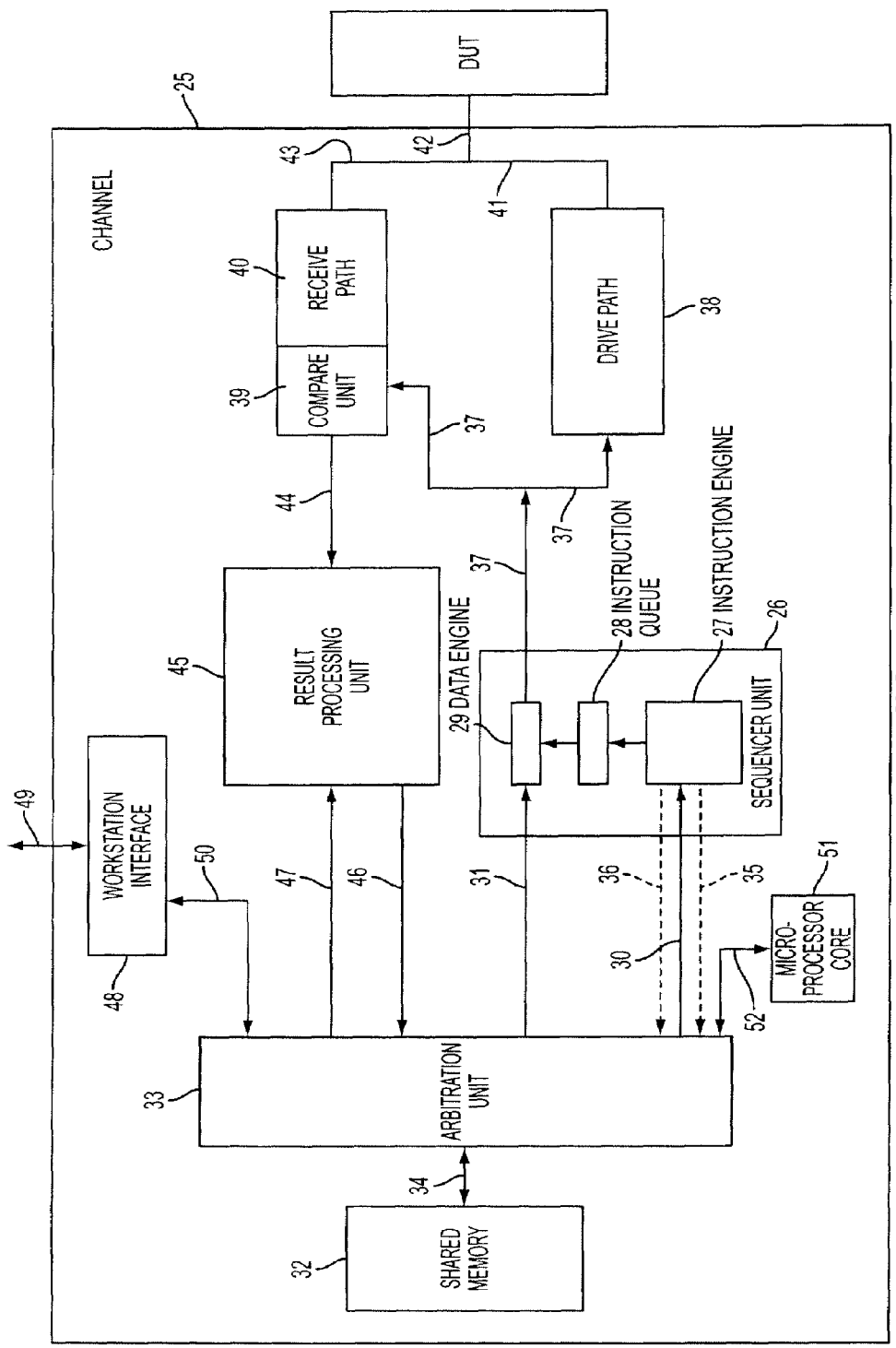
FIG. 3 shows a channel of an automated test equipment (ATE).

FIG. 3 shows a channel 25 of an automated test equipment that is responsible for at least one of: providing stimulus data to a DUT, and analyzing response data obtained from said DUT. The channel 25 is equipped with a sequencer unit 26 according to an embodiment of the present invention. The sequencer unit 26 comprises an instruction engine 27, an instruction queue 28 and a data engine 29.

In the embodiment shown in FIG. 1, instructions are received from an instruction memory, and data is received from a data memory. In contrast, in the embodiment shown in FIG. 3, the sequencer unit 26 receives both instructions 30 and data 31 from one shared memory 32. Because large amounts of data have to be accommodated, said shared memory 32 is preferably implemented as a RDRAM. The shared memory 32 is accessed via an arbitration unit 33. Said arbitration unit 33 receives read and write requests from various functional units of the channel 25 and schedules a sequence 34 of read and write accesses to the shared memory 32.

In order to request instructions 30, the instruction engine 27 might issue an instruction read request 35 to the arbitration unit 33. When said instruction read request 35 is received by the arbitration unit 33, a corresponding read access is performed, and the instructions 30 fetched from the shared memory 32 are provided to the instruction engine 27. The instruction engine 27 preprocesses said instructions, and for each instruction that requires input data, the instruction engine 27 issues a corresponding data read request 36 to the arbitration unit 33. The corresponding read access is performed, and the requested data 31 is provided to the data engine 29.

The output data stream 37 generated by the sequencer unit 26 might comprise both drive data and expected data. The output data stream 37 is provided both to the drive path 38 and to the compare unit 39 of the receive path 40. The drive path 38 might comprise a waveform table, which is a look-up table adapted for converting the vectors of the output data stream 37 into a corresponding sequence of waveforms. Each waveform comprises a set of edges, together with timing information for said edges. At the output of the drive path 38, a stream of stimulus data 41 is obtained, and said stream of stimulus data 41 is provided to the pin 42 of the DUT.

Alternatively or additionally, a stream of response data 43 might be obtained from the pin 42 of the DUT. In the compare unit 39, the response data 43 is compared with expected data that is transmitted as a part of the output data stream 37. For this reason, the output data stream 37 is provided to the compare unit 39 of the receive path 40. The compare unit 39 generates a stream of result data 44 comprising the results of the comparison. Said stream of result data 44 is provided to the result processing unit 45. The result processing unit 45 might e.g. generate an error map by recording the results as a function of the respective cycle. The error map data 46 is written, via the arbitration unit 33, to the shared memory 32.

When a DUT is tested, different kinds of errors might occur simultaneously. If only a subset of said errors is to be tracked and analyzed, it will be required to mask out all the other errors. For this purpose, cycle mask data 47 that is read from the shared memory 32 is provided to the result processing unit 45. Said cycle mask data 47 defines those parts of the stream of result data 44 that have to be masked out.

For exchanging the shared memory's content with a workstation, the channel 25 might comprise a workstation interface 48 adapted for establishing a data link 49 with the workstation. Via the workstation interface 48, data 50 can be exchanged between the workstation and the shared memory 32. Furthermore, the channel 25 might comprise an embedded microprocessor core 51. Between said microprocessor core 51 and the shared memory 32, data 52 can be exchanged.

What is claimed is:

1. A sequencer unit for generating a stream of test data in a channel of an automated test equipment, said sequencer unit comprising:
   a first instruction processing unit for receiving and processing a stream of instructions, wherein in case data is required by a certain instruction, a corresponding data read request for fetching said data is issued;
   an instruction buffer for buffering instructions that wait for requested data; and
   a second instruction processing unit for receiving requested data that corresponds to one of the issued data read requests, for assigning the requested data to the corresponding instructions buffered in the instruction buffer, and for processing said instructions in order to generate the stream of test data.

2. The sequencer unit of claim 1, wherein said first instruction processing unit irequests instructions by issuing instruction read requests.

3. The sequencer unit of claim 1, wherein said stream of instructions comprises at least one of flow control instructions, data sequencing instructions, break instructions, set data instructions.

4. The sequencer unit of claim 1, wherein said stream of instructions comprises flow control instructions and said first instruction processing unit processes said flow control instructions.

5. The sequencer unit of claim 1, wherein said stream of instructions comprises data sequencing instructions, and said first instruction processing unit preprocesses said data sequencing instructions, and wherein said second instruction processing unit completes processing of said data sequencing instructions.

6. The sequencer unit of claim 1, comprising at least one of the features:
   said first instruction processing unit stores instructions that wait for requested data to said instruction buffer;
   said second instruction processing unit assigns the requested data in sequential order to the corresponding instructions buffered in the instruction buffer;
   said instruction buffer is implemented as a FIFO buffer;
   said sequencer unit receives said instructions and said data from at least one storage;
   said first instruction processing unit receives said instructions from an instruction memory that is preferably implemented as an SRAM;
   said second instruction processing unit receives said requested data from a data memory that is preferably implemented as a DRAM;
   said sequencer unit receives both said instructions and said data from a shared memory;
   said first instruction processing unit issues data read requests that indicate both the start address and the size of requested data.

7. The sequencer unit of claim 1, wherein said channel is responsible for at least one of: providing stimulus data to at least one DUT, and receiving response data from said at least one DUT.

8. The sequencer unit of claim 7, comprising at least one of the features:
   said test data includes at least one of vector data and expected data;
   said sequencer unit provides said test data to at least one of the channel's drive path and the channel's receive path;
   said test data additionally includes set data for modifying the channel's settings;
   said test data additionally includes refresh vectors initiates a refresh of at least one DRAM that is part of said at least one DUT.

9. The sequencer unit of claim 1, wherein said sequencer unit generates test data;
   and wherein said sequencer unit is included in at least one channel for use in an automated test equipment, said at least one channel including:
   at least one storage for storing at least one of instructions and data; and
   a result processing unit for evaluating response data obtained from at least one DUT.

10. The at least one channel of claim 9, wherein said at least one channel is responsible for at least one of: providing stimulus data to said at least one DUT, and receiving response data from said at least one DUT;
    and wherein said at least one channel is included in an automated test equipment for testing at least one DUT, said automated test equipment including a central facility for coordinating said at least one channel.

11. The automated test equipment of claim 10, comprising one of the features:
    said automated test equipment is implemented as a centralized tester architecture that is under clock control of said central facility;
    said automated test equipment is implemented according to a tester-per-pin architecture, wherein said channels represent independent functional units.

12. The sequencer unit of claim 6, wherein said shared memory is implemented as at least one of a DRAM and a RDRAM.

* * * * *